United States Patent [19]

Godard

[11] 4,135,167

[45] Jan. 16, 1979

[54] LASER HAVING A BRIEF DISCHARGE BETWEEN TWO ELONGATED ELECTRODES

[75] Inventor: Bruno Godard, Gif sur Yvette, France

[73] Assignee: Compagnie Generale d'Electricite S.A., Paris, France

[21] Appl. No.: 891,250

[22] Filed: Mar. 29, 1978

Related U.S. Application Data

[63] Continuation of Ser. No. 686,434, May 14, 1976, abandoned.

[30] Foreign Application Priority Data

May 30, 1975 [FR] France .............................. 75 17034
Mar. 31, 1976 [FR] France .............................. 76 09394

[51] Int. Cl.² ........................................... H01S 3/097
[52] U.S. Cl. .............................. 331/94.5 PE; 330/4.3; 313/217
[58] Field of Search ................ 331/94.5 PE; 313/217, 313/326; 330/4.3

[56] References Cited

U.S. PATENT DOCUMENTS 3,886,479  5/1975  Pearson ..................... 331/94.5 PE

OTHER PUBLICATIONS

Basting, *Opto-electronics*, vol. 4 (1972), pp. 43-44.
Godard, *IEEE Journal of Quantum Electronics*, vol. QE-10, No. 2, (Feb. 1974), pp. 147-153.

*Primary Examiner*—William L. Sikes
*Attorney, Agent, or Firm*—Sughrue, Rothwell, Mion, Zinn and Macpeak

[57] ABSTRACT

The invention concerns a travelling wave laser and has application to the reduction of the divergence of laser beams. The electrodes between which the travelling electric discharge for the excitation of the amplifier gas takes place have a cross-section in the shape of two polished rounded-off points facing each other, so as to prevent spurious reflections of light towards the discharge zone and to reduce the divergence of the output beam which is converged by means of a simple optical system.

7 Claims, 3 Drawing Figures

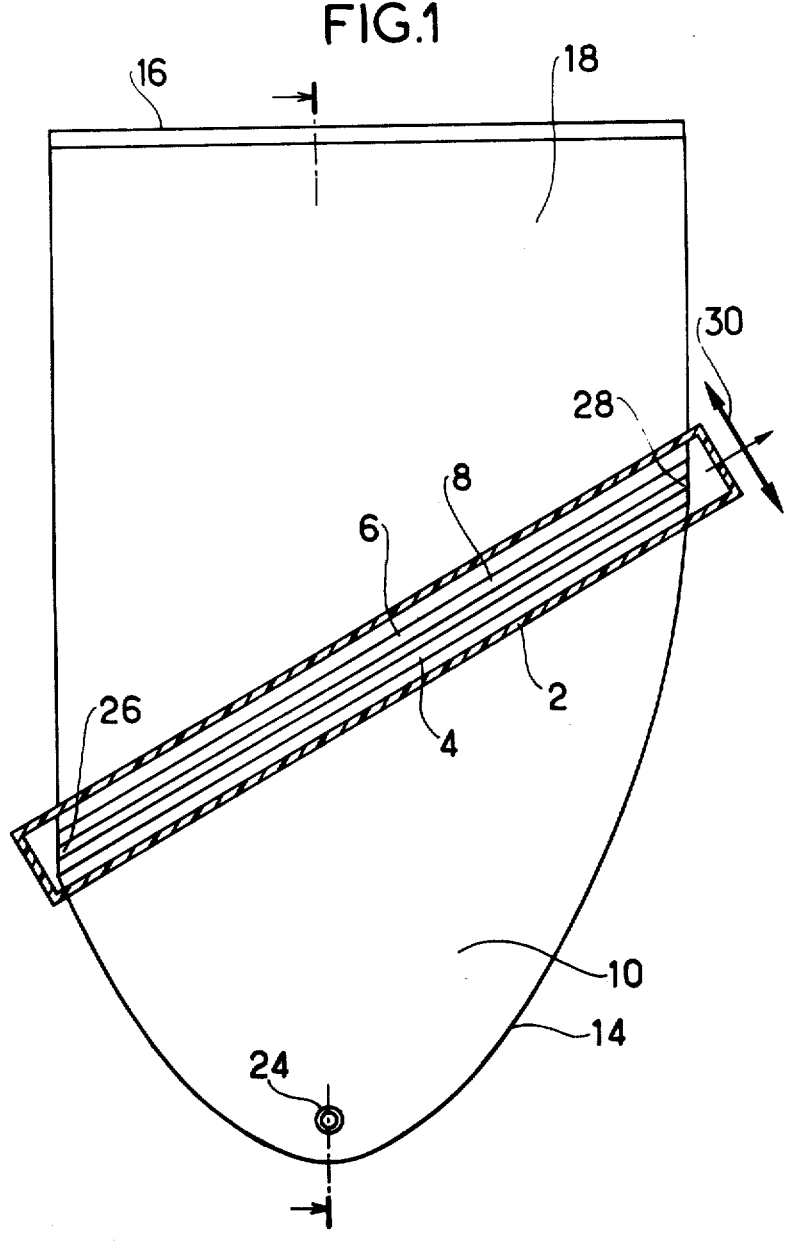
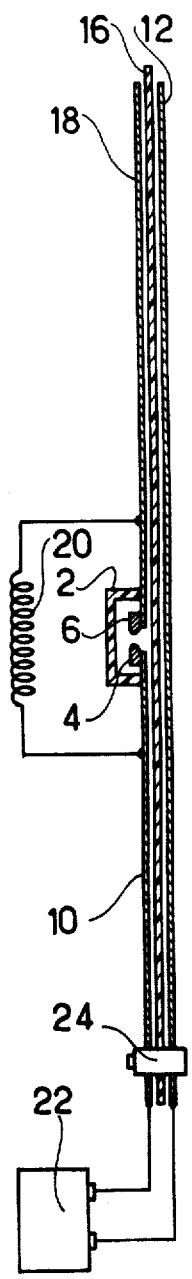

LASER HAVING A BRIEF DISCHARGE BETWEEN TWO ELONGATED ELECTRODES

BACKGROUND OF THE INVENTION

1. Field Of The Invention

The present invention concerns a laser having a brief discharge between two elongated electrodes.

2. Description Of The Prior Art

In such a laser, the direction of light emission is generally defined mainly by the shape of the space in which the light amplification takes place and not by a resonant optical cavity. The main direction of emission is then that along which the light is amplified for the longest time, i.e. along the channel situated between the two elongated electrodes. The problem is to obtain light emission having as little divergence as possible.

This problem arises more particularly in the case of a laser having a brief discharge of the travelling wave type. Such a laser comprises, conventionally, a flat-plate transmission line with conductive surfaces having a parabolic edge; a spark gap placed at the focus of the parabola short-circuits the two conductive surfaces after the line has been charged and thus generates a cylindrical travelling electric wave front in the line which is converted to a plane wave front by reflection at the edges; a laser channel is formed by interrupting one of the conductive surfaces with a rectilinear slot whose edges constitute the two elongated electrodes and by keeping a gas, such as nitrogen, in that slot. This channel is disposed at an angle to the axis of the parabola; the two electrodes are electrically connected by an induction coil for the charging of the transmission line. A localized electric discharge is thus obtained between the electrodes which moves along the channel at the speed of light and which effects a very rapid excitation of the nitrogen.

This excitation enables the selective amplifying of a travelling light wave accompanying the discharge zone. Such a laser is described in the article by M.B. GODARD - "A simple high-power large efficiency $N_2$ ultraviolet laser", I.E.E.E. Journal of Quantum Electronics, vol. QE-10 No. 2, February, 1974, pp. 147 to 153.

The electrodes between which the travelling electric discharge appears are polished and have the form of plane parallel surfaces with rounded edges. Such a form is, indeed, simple and conventional for setting up an electric discharge between two electrodes when the firing voltage is required to be well determined and when damaging of the electrodes is to be prevented.

The pulse laser beam thus obtained is not parallel and has a divergence, which can be partly eliminated by placing a lens in the path of the beam having a focus which coincides with a first end of the laser channel, i.e. with the zone in which the electric discharge begins and from which the light wave is subsequently amplified all along the channel. The residual is, however, still a hindrance and cannot be sufficiently corrected by optical means placed in the beam.

Preferred embodiments of the present invention provide a laser having a brief discharge between two elongated electrodes, with a beam of reduced divergence.

The present invention provides a brief discharge laser comprising an enclosure for containing a gas capable of amplifying light when excited by an electric discharge, two parallel elongated electrodes disposed in the enclosure, and having adjacent faces which form two sides of an elongated laser channel running from a first end to a second end, electric means for so generating a brief discharge across the faces of the electrodes that, in operation, a light wave appearing at the first end of the channel and propagating towards the second end is amplified as it passes through excited gas and leaves the enclosure through a suitably placed window in the enclosure, and a convergent optical system placed in the path of light leaving the second end of the channel and having a focus substantially coinciding with the first end of the channel; the shape of said adjacent faces of each of the electrodes as seen in a cross-sectional view taken in a plane perpendicular to the channel being that of a rounded-off point directed towards the other electrode whereby any light propagating obliquely along the channel and being reflected from either electrode is reflected outside the channel and therefore ceases to be amplified during operation of the laser.

A brief discharge travelling wave laser is known, whose electrodes have the form of a rounded point, when seen in a cross-section view taken through a plane perpendicular to the channel containing the active gas. See the British periodical "Opto Electronics" vol. 4 No. 1, February, 1972, pages 43–49, publishing an article by D. Basting et al, "A simple high power nitrogen laser". The laser described therein supplies a beam having great divergence of 66 milliradians in one direction and of 26 milliradians in the other. Its teaching has therefore never been taken into consideration when it was sought to reduce the divergence of the output beam of a laser.

The efficiency of the present invention resides in the fact that the irreducible part of the divergence of known brief discharge lasers was essentially due to the fact that a part of the excitation energy of the gas was used for amplifying light waves which were propagated obliquely in the laser channel by successive reflections on the plane parts of the adjacent faces of the electrodes.

An embodiment of the invention is described, by way of example, with reference to the accompanying drawings.

BRIEF DESCRIPTION OF THE DRAWINGS

FIG. 1 is a diagrammatic plan view and partial cross-section of a travelling wave laser forming an embodiment of the present invention;

FIG. 2 is a diagrammatic cross-section view of the laser of FIG. 1,

In FIGS. 1 and 2, the laser comprises an elongated enclosure 2, made of methyl polymethacrylate containing nitrogen at a pressure lying between 30 and 60 millibars, for example 50 millibars. Two elongated stainless steel electrodes 4 and 6 are arranged parallel to each other in the enclosure and form the edges of a laser channel 8 which is 90 cm long.

Figure 3:
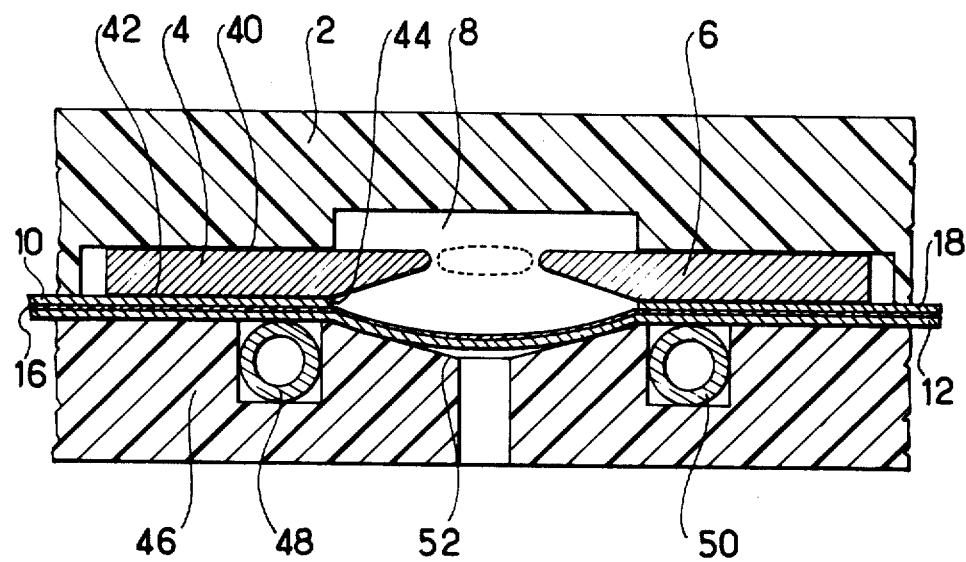
FIG. 3 is a cross-section view of the embodiment of FIGS. 1 and 2 in a plane perpendicular to the laser channel on a larger scale to the other figures showing the electrodes between which the progressive electric discharge occurs.

A flat-plate transmission line is formed by two thin copper sheets 10 and 12, one of whose edges forms a parabola 14, separated by an insulating sheet 16 made of polyester or polyimide, having a thickness of 75 microns. Another edge of the sheet 10 is in contact with the electrode 4. Another sheet 18, made of copper, is placed in the extension of the sheet 10 and has one edge in contact with the electrode 6. It is connected to the sheet 10 by an inductance coil 20.

An electric generator 22 charges the flat-plate transmission line thus formed to a voltage of 1 to 10 kV, for example 5 kV.

A spark gap 24, placed at the focus of the parabola 14, then sets up a discharge of the transmission line by suddenly connecting the sheet 10 to the sheet 12. This results in the production of an electric wave in the transmission line. This wave is initially circular, then, by reflection on the parabola 14, it becomes a rectilinear wave which is perpendicular to the axis of that parabola and which is propagated parallel to the axis of the parabola towards the channel 8. When it reaches the channel 8, it sets up a brief electric discharge therein between the electrodes 4 and 6.

Because of the inclination of the channel in relation to the electric wave, the discharge is propagated from a first end 26 of the channel up to a second end 28 at the speed of light. A light wave appearing at the first end 26 and going towards the second end 28 therefore accompanies the electric discharge. Provided the light wave has a wavelength of 3371 angstroms, it is amplified along the whole channel 8 by the nitrogen which is excited by the electric discharge, whereas a light wave having the same wavelength, but with a very different direction of propagation will be amplified only over a very short path.

Since the amplified wave begins at the first end 26, a convergent lens 30 whose focus coincides with the first end 26 is used to obtain a parallel output beam. Nevertheless, there remains a divergence of the beam, for certain waves are reflected by the electrodes 4 and 6, forming a slight angle with the axis of the channel 8, this imparting to them a propagation speed in the direction of the channel which is very close to that of the electric discharge. These waves, having the suitable wavelength of 3371 angstroms are also therefore amplified along the whole channel.

The shape of the electrodes 4 and 6 shown in FIG. 3 makes it possible to avoid these reflections and the spurious amplification. Each of these electrodes is polished and has, in its cross-section, a rounded off tip or point directed towards the other electrode.

The radius of curvature of the rounded off tip, for example 1 mm, is preferably less than a quarter of the width of the channel 8, situated between the points, for example 6 or 7 mm. This radius should not, however, be less than 2% of the channel width. Each tip forms an arc of a circle comprised, preferably, between 120° and 170°, so that the thickness of the electrodes may become greater on moving away from the channel 8. Beyond their tips, the electrodes have the general form of blades with a thickness of 5 mm and have two faces parallel to the plane of the sheets 10, 12 and 18. The face furthest from the sheets (such as 40) remains parallel to that general direction up to the rounded off point. The other face (such as 42) is in contact with the sheet 10 (or the sheet 18) up to the edge of that sheet, which constituted by an edge line such as 44. Beyond the edge, the said other face extends away from the plane of the sheets up towards the rounded-off point.

This makes it possible to move the discharge zone away from the insulating sheet 16. The discharge zone is shown by a dotted line between the rounded-off points.

The sheets 10, 12, 16 and 18, which are resilient, are fixed on a support 46 which ensures the mechanical rigidity of the assembly.

The support has two grooves cut in it under parts of the electrodes 4 and 6 which are in contact with the sheets 10 and 18 and in the vicinity of the edges such as 44.

Means for pressing flexibly the assembly formed by the sheets 10, 12, 16 and 18 against the electrodes 4 and 6 and for ensuring proper contact between the electrodes 4 and 6 and the sheets 10 and 18 are arranged in the said grooves. These means are constituted by resilient tubes 48 and 50.

The stand 46 forms, on the other hand, a depression 52 adjacent to the inside space of the enclosure 2, so as to bring the sheets 16 and 12 away from the channel 8. This is ensured by making the bottom of the depression 52 communicate with a vacuum pump, not shown.

The laser which has just been described makes it possible to obtain with the lens 30, a beam having a divergence of 0.3 milliradians, whereas if the usual form of electrodes had been used, the divergence would have been approximately 10 milliradians, using an analogous lens. The duration of the light pulse is generally comprised between 2 and 12 ns.

It can sometimes be useful to arrange, in the vicinity of the spark gap 24, a reflector to prevent the circular wave generated at the spark gap from reaching directly the laser channel 8. Nevertheless, this precaution is not indispensable, for the direct wave reaches the channel almost at the same time as the wave reflected by the parabola.

Inasmuch as concerns the choice of voltages to be applied between the metallic sheets 10 and 12, it should be observed that the lower these voltages are, the more the distance between the electrodes 4 and 6 can be reduced, for a constant pressure. It is desirable to bring it to less than 9 mm, this making it possible to reduce further the residual divergence of the beam. The pressure is, to great advantage, comprised between 30 and 60 millibars. Since the energy of the electric discharge cannot be much reduced, it is an advantage to choose a small distance between the sheets 10 and 12, i.e., a small thickness for the dielectric sheet 16, of less than 130 microns. In practice, for a thickness of 75 microns, a voltage of 5 kV is suitable with a distance between electrodes of 6.7 mm. It is, however, practically possible to go down to a voltage of 1 kV with a distance between electrodes of 2 mm and a thickness of the sheet 16 of 25 microns.

Although one embodiment of the invention which appeared to afford an advantage has been described, that embodiment using, to set up the electric discharge in the laser channel, a flat-plate transmission line having a parabolic edge, it must be understood that other forms of transmission lines can also be used. It is, for example, possible to store the electric energy in a set of discrete capacitors.

What we claim is:

1. A brief discharge laser comprising an enclosure for containing a gas capable of amplifying light when excited by an electric discharge, two parallel elongated electrodes disposed in the enclosure and having adjacent faces which form two sides of an elongated laser channel running from a first end to a second end, electric means for so generating a brief discharge across the faces of the electrodes that, in operation, a light wave appearing at the first end of the channel and propagating towards the second end is amplified as it passes through the excited gas and leaves the enclosure through a suitably placed window in the enclosure, and a convergent optical system placed in the path of light leaving the second end of the channel and having a focus substantially coinciding with the first end of the channel; the cross-sectional shape of said adjacent faces of each of the electrodes in a plane perpendicular to the channel being that of a rounded-off point directed towards the other electrode whereby any light propagating obliquely along the channel and being reflected from either electrode is reflected outside the channel and therefore ceases to be amplified during operation of the laser; wherein the sides of said rounded-off point are substantially plane, and are joined by an arc forming the end of the point which arc is between 120° and 170°.

2. Laser according to claim 1, wherein the radius of curvature of the said rounded-off point comprises between 2% and 25% of the width of the said laser channel.

3. A laser according to claim 1, wherein said electric means are means for initiating said brief discharge across the electrodes at said first end of the channel, and traveling said discharge towards the second end at substantially the same speed as the light propagating therealong whereby the light is selectively amplified along the length of the channel.

4. A laser according to claim 3, wherein said electric means for generating the discharge comprises; two metallic sheets separated by an insulating sheet, one of the metallic sheets being divided into two parts with the elongated electrodes being connected along respective edges of the division, means for charing charging sheet relative to the other and means for firing a travelling electric wave in the flat-plate transmission line defined by the sheets; wherein the insulating sheet is less than 130 microns thick, the elongated electrodes are less than 9 mm apart, and the enclosure contains said gas capable of amplifying light at a pressure between 30 and 60 millibars.

5. A brief discharge laser comprising an enclosure for containing a gas capable of amplifying light when excited by an electric discharge, two parallel elongated electrodes disposed in the enclosure and having adjacent faces which form two sides of an elongated laser channel running from a first end to a second end, electric means for so generating a brief discharge across the faces of the electrodes that, in operation, a light wave appearing at the first end of the channel and propagating towards the second end is amplified as it passes through the excited gas and leaves the enclosure through a suitably placed window in the enclosure, and a convergent optical system placed in the path of light leaving the second end of the channel and having a focus substantially coinciding with the first end of the channel; the cross-sectional shape of said adjacent faces of each of the electrodes in a plane perpendicular to the channel being that of a rounded-off point directed towards the other electrode whereby any light propagating obliquely along the channel and being reflected from either electrode is reflected outside the channel and therefore ceases to be amplified during operation of the laser; wherein said electric means are means for initiating said brief discharge across the electrodes at said first end of the channel, and travelling said discharge towards the second end at substantially the same speed as the light propagating therealong, whereby the light is selectively amplified along the length of the channel, and wherein said rounded-off point presents, along its length facing the other electrode, substantially no curvature radius greater than 25% of the width of said laser channel, said width being less than 9 mm, said curvature radius being rotated at least 120°.

6. A laser according to claim 5, wherein said electric means for generating the discharge comprises: two metallic sheets separated by an insulating sheet, one of the metallic sheets being divided into two parts with the elongated electrodes being connected along respective edges of the division, means for charging one sheet relative to the other, and means for firing a travelling electric wave in the flat-plate transmission line defined by the sheets; and wherein the insulating sheet is less than 130 microns thick, the elongated electrodes are less than 9 mm apart, and the enclosure contains said gas capable of amplifying light at a pressure between 30 and 60 millibars.

7. A brief discharge laser comprising an enclosure for containing a gas capable of amplifying light when excited by an electric discharge, two parallel elongated electrodes disposed in the enclosure and having adjacent faces which form two sides of an elongated laser channel running from a first end to a second end, electric means for so generating a brief discharge across the faces of the electrodes, that, in operation, a light wave appearing at the first end of the channel and propagating towards the second end is amplified as it passes through the excited gas and leaves the enclosure through a suitably placed window in the enclosure, and a convergent optical system placed in the path of light leaving the second end of the channel and having a focus substantially coinciding with the first end of the channel; the cross-sectional shape of said adjacent faces of each of the electrodes in a plane perpendicular to the channel being that of a rounded-off point directed towards the other electrode whereby any light propagating obliquely along the channel and being reflected from either electrode is reflected outside the channel and therefore ceases to be amplified during operation of the laser; wherein said electric means for generating the discharge comprises: two metallic sheets separated by an insulating sheet, one of the metallic sheets being divided into two parts with the elongated electrodes being connected along respective edges of the division, means for charging one sheet relative to the other, and means for firing a travelling electric wave in the flat-plate transmission line defined by the sheets; and wherein the insulating sheet is less than 130 microns thick, the elongated electrodes are less than 9 mm apart, said rounded-off point presents along its length facing the other electrode, substantially no radius of curvature greater than 25% of said laser channel as defined by the spacing of said elongated electrodes, said radius of curvature being rotated at least 120°, and the enclosure contains said gas capable of amplifying light at a pressure of between 30 and 60 millibars.

* * * * *